United States Patent
Ou (10) Patent No.: US 12,535,422 B2
(45) Date of Patent: Jan. 27, 2026

(54) SYSTEM INCLUDING A LASER MODULE

(71) Applicant: ATONARP INC., Tokyo (JP)

(72) Inventor: Neil Ou, Cupertino, CA (US)

(73) Assignee: ATONARP INC., Tokyo (JP)

( * ) Notice: Subject to any disclaimer, the term of this patent is extended or adjusted under 35 U.S.C. 154(b) by 21 days.

(21) Appl. No.: 18/698,204

(22) PCT Filed: Oct. 14, 2022

(86) PCT No.: PCT/JP2022/038357
§ 371 (c)(1),
(2) Date: Apr. 3, 2024

(87) PCT Pub. No.: WO2023/063415
PCT Pub. Date: Apr. 20, 2023

(65) Prior Publication Data
US 2024/0328952 A1 Oct. 3, 2024

Related U.S. Application Data (60) Provisional application No. 63/255,767, filed on Oct. 14, 2021.

(51) Int. Cl.
*G01J 3/44* (2006.01)
*G01N 21/65* (2006.01)

(52) U.S. Cl.
CPC ....... *G01N 21/65* (2013.01); *G01N 2021/653* (2013.01); *G01N 2201/06113* (2013.01); *G01N 2201/08* (2013.01); *G01N 2201/10* (2013.01)

(58) Field of Classification Search
CPC ............. G01N 21/65; G01N 2021/653; G01N 2201/06113; G01N 2201/08;
(Continued)

(56) References Cited

U.S. PATENT DOCUMENTS

2015/0369742 A1   12/2015  Tamada et al.
2016/0334618 A1*  11/2016  Hargis ................. H01S 3/2391
(Continued)

FOREIGN PATENT DOCUMENTS

CN   101764350 A   6/2010
CN   112751255 A   5/2021
(Continued)

OTHER PUBLICATIONS

International Search Report (PCT/ISA/210) and Written Opinion (PCT/ISA/237) mailed on Jan. 10, 2023, by the Japanese Patent Office as the International Searching Authority for International Application No. PCT/JP2022/038357, 5 pages.
(Continued)

*Primary Examiner* — Abdullahi Nur
(74) *Attorney, Agent, or Firm* — BUCHANAN INGERSOLL & ROONEY PC (57) ABSTRACT

A system includes a laser module that includes a first laser source configured to generate a narrowband first source laser light; and a plurality of routes configured by optical fibers without using a free space. The plurality of routes includes: a first route for splitting the first source light pulses for generating Stokes light pulses and pump light pulses; a second route for amplifying and broadening a range of wavelengths with a first train including a first amplifier, a first HCPCF, and HNLPCF spliced to supply the Stokes light pulses; and a third route for amplifying with a second train including a second amplifier and a second HCPCF spliced to supply the pump light pulses.

16 Claims, 5 Drawing Sheets

(58) Field of Classification Search
CPC . G01N 2201/10; G01N 2021/655; G01J 3/44; A61B 5/00
See application file for complete search history.

(56) References Cited

U.S. PATENT DOCUMENTS

2016/0365697 A1    12/2016    Hori et al.
2017/0288363 A1*    10/2017    Magnano ............. H01S 3/2391

FOREIGN PATENT DOCUMENTS

| WO | 2007083110 A1 | 7/2007 |
| WO | 2014061147 A1 | 4/2014 |
| WO | 2020222300 A1 | 11/2020 |

OTHER PUBLICATIONS

Maurel, et al., "Scalable hollow fiber pulse compressor for NIR and UV lasers", HAL open science, SPIE Photonic West, HAL ID: hal-02329692, Feb. 2019, 10 pages.

* cited by examiner

SYSTEM INCLUDING A LASER MODULE

TECHNICAL FIELD

The invention generally relates to a system that includes a laser module.

BACKGROUND ART

In a publication WO2014/061147, a microscope is disclosed. The microscope includes: a first light dividing part that divides a light flux of light from a light source into a first pump light flux and a second pump light flux; a Stokes light source that receives the second pump light flux as an input and outputs a Stokes light flux: a multiplexing part that multiplexes the first pump light flux and the Stokes light flux to generate a multiplexed light flux; a first light-collecting part that collects the multiplexed light flux in a sample; a first detector that detects CARS light generated from the sample, the CARS light having a wavelength different from the multiplexed light flux; a second light dividing part that lets at least one of the second pump light flux and the Stokes light flux branch partially as a reference light flux; a second multiplexing part that multiplexes a light flux from the sample and the reference light flux to generate interfering light; and a second detector that detects the interfering light.

SUMMARY OF INVENTION

To monitor or observe the nonlinear optical process, such as CARS (Coherent Anti-Stokes Raman Scattering, Coherent Anti-Stokes Raman Spectroscopy), acquiring the signals made by the process using the broadband light pulses, such as the Stokes light pulses, and the narrowband light pulses, such as the pump light pulses, supplied from a compact system is required.

One of aspects of this invention is a system comprising a laser module that includes: a first laser source configured to generate a narrowband first source laser light; and a plurality of routes configured by optical fibers and/or a photonic integrated circuit without using a free space. The plurality of routes includes: (i) a first route (a first section, a first stage) for splitting the first source light pulses for generating broadband first light pulses and narrowband second light pulses: (ii) a second route (a second section, a second stage) for amplifying and broadening a range of wavelengths with a first train including a first amplifier, a first hollow-core photonic crystal fiber (HCPCF), and highly non-liner photonic crystal fiber (HNLPCF) spliced to supply the broadband first light pulses; and (iii) a third route (a third section, a third stage) for amplifying with a second train including a second amplifier and a second HCPCF spliced to supply the narrowband second light pulses. In the second route, by splicing (connecting) directly (without free space) two different types of photonic crystal fibers (PCFs), i.e., HCPCF and HNLPCF with the amplifier, the compression function provided by the HCPCF and the supercontinuum (SC) generation function provided by the HNLPCF can be integrated into a single series of fibers or photonic integrated circuits with the amplifier, and the system including the laser module can be made compact by omitting one or more free-space grating compressors and other free-space optical elements. In addition, in the third route, by splicing (connecting) the second HNLPCF (different to the first HNLPCF) and the amplifier for the narrowband second light pulses directly (without free space), the compression function provided by the HCPCF and the amplifier can be integrated into a single series of fibers or photonic integrated circuits that makes the system including the laser module more compact by omitting further free-space grating compressors and free-space optical elements.

The plurality of routes may include a fourth route for multiplexing the broadband first light pulses and the narrowband second light pulses and outputting the first light pulses and the second light pulses overlapping in time as an irradiation beam to irradiate a target. The fourth route may include a chirp rate conditioner for varying at least one of a chirp rate of the first light pulses supplied by the second route and a chirp rate of the second light pulses supplied by the third route to make them substantially equal. The first light pulses may include a first range of wavelengths and the second light pulses may include a second range of wavelengths shorter than the first range of wavelengths. In this system, the first light pulses and the second light pulses can be emitted via the fourth route as the irradiation beam from the integrated optical fibers or the photonic integrated circuits without free space optical elements, which makes the system more compact.

The plurality of routes may include a fifth route for generating a narrowband third light pulses with a third range of wavelengths shorter than the second range of wavelengths from a second source laser light, and with a third train including a third amplifier, a third HCPCF and a Second Harmonic Generation (SHG) spliced to supply the third light pulses. The plurality of routes may further include a sixth route for multiplexing the broadband first light pulses, the narrowband second light pulses, and the narrowband third light pulses and outputting the first light pulses, the second light pulses and the third light pulses overlapping with a time delay as an irradiation beam to irradiate a target. The system may further comprise an optical module for supplying the first light pulses, the second light pulses and the third light pulses to the target as the irradiation beam. The laser module may include an oscillator that is configured to output a base laser with mode-locked to be split for generation of the first source laser light and the second source laser light. One of typical ranges of wavelengths of the first source laser light may be centered at 1030 nm and one of typical ranges of wavelengths the second source laser light may be centered at 1560 nm.

The system may include a detector configured to detect a signal beam generated by the target as a result of irradiation of the target with the irradiation beam. The system may include a scanner that is configured to scan the target with the irradiation beam to acquire the signal at each pixel for performing 2D microscopy imaging. The system may include a scanner that is configured to scan the target with the irradiation beam to acquire the signal at each voxel for performing 3D microscopy imaging.

One of typical applications of the system is a system including detection and/or analysis of CARS signals from the target. The system may include an optical module for supplying the first light pulses as Stokes light pulses and the second light pulse as pump light pulses for generating CARS signals. The optical module may include a light path for supplying the first light pulses as Stokes light pulses, the second light pulse as pump light pulses and the third light pulses as the probe light pulses for generating CARS (TD-CARS) signals.

BRIEF DESCRIPTION OF DRAWINGS

The embodiments herein will be better understood from the following detailed description with reference to the drawings, in which.

DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Many terminologies used in fiber laser and nonlinear optics will be shown in this specification and the abbreviation thereof will be used. The following list is the abbreviations used in this specification.

Figure 1:
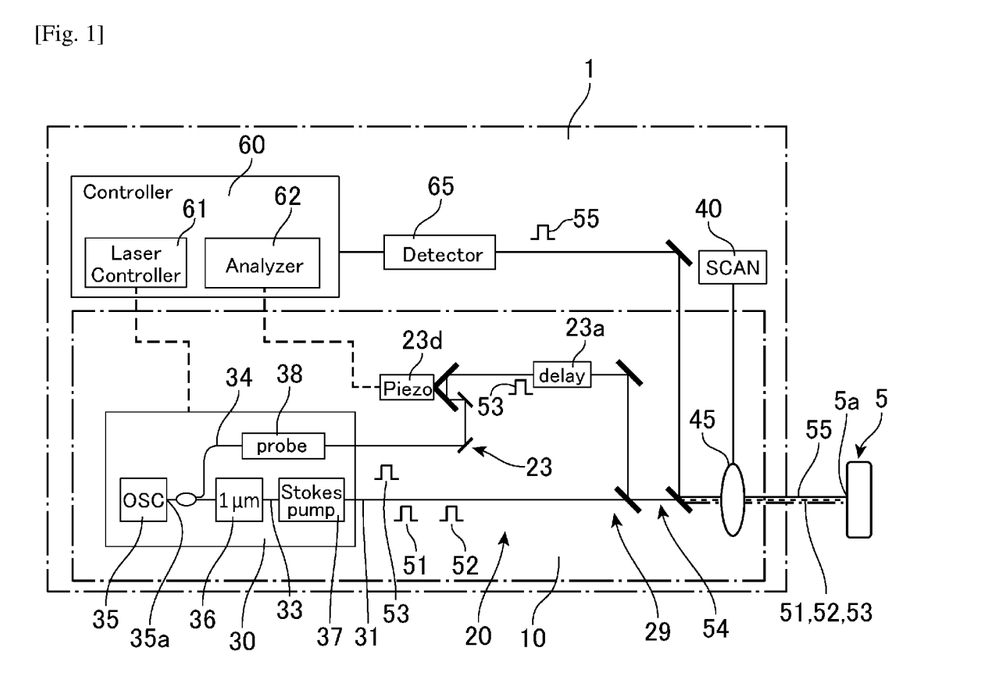
FIG. 1 depicts an embodiment of a system of this invention.

FL Fiber Laser
OSC Oscillator
LD Laser diode
PD Photodiode
EVOA Electronically Controlled Variable Optical Attenuator
SAM Saturable Absorber Mirror
FC/APC Ferrule Connecter/Angled physical Contact
Er Erbium
EDFA Erbium Doped Fiber Amplifier
Yb Ytterbium
YDFA Ytterbium Doped Fiber Amplifier
SMF Single Mode Fiber
PM Polarization Maintaining
HNLF Highly Nonlinear Fiber
PCF Photonic Crystal Fiber
HCPCF Hollow-Core Photonic Crystal Fiber
HNLPCF Highly Non-Liner Photonic Crystal Fiber
SCPCF Supercontinuum Photonic Crystal Fiber
WDM Wavelength Division Multiplexing
CIR Optical Circulator
SC Supercontinuum
SHG Second Harmonic Generation
FWHM Full Width Half Maximum
CARS Coherent Anti-Stokes Raman Spectroscopy
CPA Chirped Pulse Amplification
CFBG Chirped Fiber Bragg Grating
IW Isolator/WDM Hybrid
TW Tap/WDM Hybrid
TIW Tap/Isolator/WDM Hybrid
NPD Non-photon Power Dissipation FIG. 1 illustrates a system 1 according to an embodiment of this invention. The system 1 comprises an optical module 10 for supplying a Stokes light pulses 51 as the first light pulses, a pump light 52 as the second light pulses and a probe light 53 as the third light pulses for generating a CARS light (CARS signals, signal beam) 55 on a point 5a of a target (object, sample) 5 irradiated by the beam including the Stokes light pulses 51, the pump light pulses 52 and the probe light pulses 53. The optical module 10 includes a laser module 30 for supplying a first beam 31 in which the Stokes light pulses 51 and the pump light pulses 52 are overlapped in time, and the probe light 53; and an optical plate 20 that includes a plurality of optical elements 29 for combining or integrating the Stokes light pulses 51, the pump light pulses 52 and the probe light pulses 53 as the irradiation beam 54. The system 1 may include a scanning module 40 that is configured to scan the target 5 by the Stokes light pulses 51, the pump light pulses 52 and the probe light pulses 53 and acquire the CARS light 55 from the target 5 through a lens 45 and other optical elements; and a detector 65 that is configured to detect the CARS light 55 for analyzing. The system 1 may include a controller (processor) 60 for controlling the entire system 1. The controller 60 may include other functions such as a laser control module 61, an analyzer 62 and others.

The scanning module 40 may be a fingertip scanning interface module, a non-invasive sampler, an invasive sampler, a flow path, or a wearable scanning interface. Each type of scanning interface could be changeable. The scanning module (scanner) 40 may be configured to scan the target 5 with the irradiation beam 54 to acquire the CARS signal 55 at each pixel (point) 5a for performing 2D CARS microscopy imaging. The scanner 40 may be configured to scan the target 5 with the irradiation beam 54 to acquire the CARS signal 55 at each voxel 5a for performing 3D CARS microscopy imaging.

The one of the embodiments of the laser module 30 is a fiber laser module (full fiber laser module). The fiber laser module 30 may include the 1 fÊm laser generation stage (first laser source) 36 configured to generate a narrowband first source laser light 33: a Stokes-pump pulse generation stage 37 for generating the Stokes light pulses 51 and the pump light pulses 52 from the first source laser light 33: a probe pulse generation stage 38 for generating the probe light pulses 53 from the second source laser light 34; and an oscillator 35 that is configured to output a base laser 35a with mode-locked to be split for generation of the first source laser light 33 and the second source laser light 34.

Figure 2:
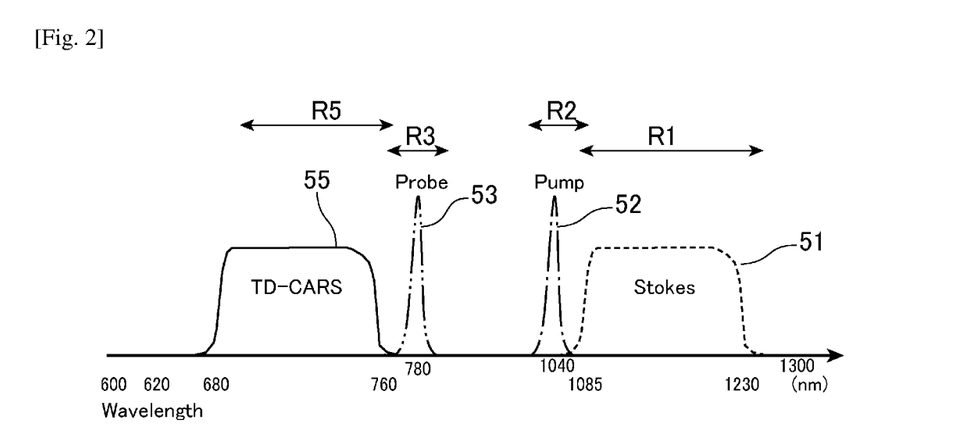
FIG. 2 depicts a wavelength plan of the above system.

FIG. 2 shows one of the wavelength plans of the CARS optical system 1. The Stokes light pulses (first light pulses) 51 have the first range R1 of wavelengths 1085-1230 nm (400 cm$^{-1}$~1500 cm$^{-1}$), the pump light pulses (second light pulses) 52 have the second range R2 of wavelengths 1040 nm, the probe light pulses (third light pulses) 53 have the third range R3 of the wavelengths 780 nm, and TD-CARS light pulses (CARS light, time dependent CARS, time delay CARS) 55 have the range R5 of the wavelengths 680-760 nm. The Stokes light pulses 51 and the pump light pulses 52 may include one to several hundred fS (femto second)-order pulse widths with tens to hundreds of mW. The probe light pulses 53 may include one to several tens pS (pico second)-order pulse widths with tens to hundreds of mW. Time-resolved coherent anti-Stokes Raman scattering or Time-delayed coherent anti-Stokes Raman scattering (TD-CARS) microscopy is also known as a technique for suppressing non-resonant background by utilizing the different temporal responses of virtual electronic transitions and Raman transitions. There is a need for a system that can easily apply such measurement methods to various applications.

On the optical plate 20, a plurality of optical elements (free space optical elements) 29 such as mirrors, prisms, dichroic mirrors, and others are mounted for constructing optical paths on a free space of the optical plate 20. One of the optical paths is an optical path 23 supplies the probe light pulses 53 with a delay module 23a for controlling time delay between the pump light 52 and the probe light 53. The other free space optical elements may be provided for combining the beams of the Stokes light 51, the pump light 52 and the probe light 53, and separating CARS beams 55.

Figure 3:
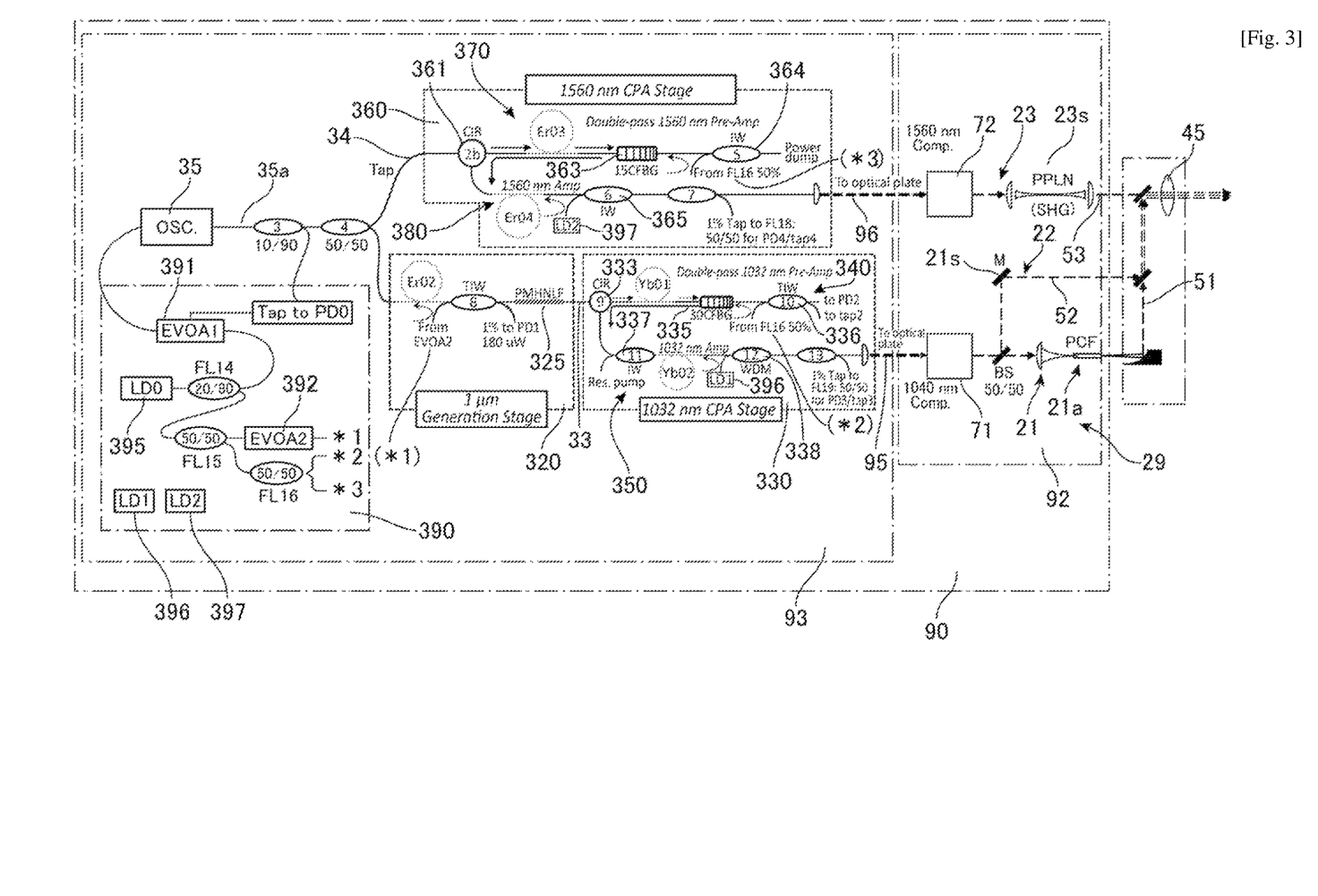
FIG. 3 depicts a block diagram of a referenced optical module.

FIG. 3 illustrates one of references of the optical module 90 including a fiber laser module (fiber laser assembly) 93 and an optical plate 92. This fiber laser module 93 provides two fundamental light sources 95 and 96 for providing the Stokes light pulses 51, the pump light pulses 52 and the probe light pulses 53. One is with a wavelength centered at 1032 nm and the other is at 1560 nm. These two outputs 95 and 96 will be the inputs to the optical plate 92 and will be match to the input requirements of the optical plate 92. The 1032 nm output 95 provides optical pulses at 12 MHz with a FWHM pulse duration of ~66 ps. The spectral FWHM bandwidth is ~14 nm and the average output power directly from the FC/APC connector connected to a collimator should be in a range from 450 mW to 520 mW. This output will be sent to a free-space grating compressor 71 for the pulse compression. After the compressor 71, the beam will be split into two arms 21 and 22 for CARS Stokes and the CARS pump generation, respectively. The provided power from the 1032 nm fiber laser output 96 is for compensating the loss in the free-space propagation, so the power level can meet the requirement of the inputs in the further stages on the optical plate.

The 1560 nm output 96 provides exactly the same pulse repetition rate at 12 MHz as the 1032 nm output 95. The FWHM pulse duration is ~35 ps and the FWHM spectral bandwidth is ~7 nm. The average output power is in a range of 130 mW to 180 mW. This output 95 will be sent to a free-space grating compressor 72 for the pulse compression. After the compressor 72, the beam 96 will be used in SHG 23s via a nonlinear crystal to provide the CARS probe beam 53 at the wavelength of 780 nm. SHG 23s may include a PPLN 23s that may have the probe pulse shape control function. The probe pulses supplied as the probe light 53 have two conflicting requirements. That is, the probe pulses having narrow bandwidth are required for higher spectral resolution of the system, and the probe pulses having sharp edge are required for a temporal resolution of the system when using time delay to suppress resonant CARS signal 55. Comparing with simple doubling crystal, by using PPLN (Periodically poled lithium niobate) 23s, higher efficiency conversion and larger bandwidth can be achieved. At the same time, using periodic structure of the PPLN results in constructive interference that generates probe edge much steeper than equivalent gaussian pulse with same bandwidth. Details of this module 93 are disclosed in the PCT/JP2021/033384 of this applicant and the entire content of this PCT application is incorporated herein by reference.

The fiber laser module 93 includes: (1) the oscillator (OSC) 35 that is configured to output the base laser 35a with mode-locked to be split for generation of the first light source 95 and the second light source 96: (2) a generator 320 that is configured to generate the first source laser light 33 by stretching wavelength range of the base laser 35a: (3) a first amplifier 330 that includes a first preamplifier 340 and a first Chirped Pulse Amplification (CPA) unit 350 for the first light source 95: (4) a second amplifier 360 that includes a second preamplifier 370 and a second Chirped Pulse Amplification (CPA) unit 380 for the second light source 96; and (5) a LD power distributor 390 that is configured to distribute a laser power from a first laser diode (LD0) 395 to the oscillator 35 as an oscillation source, to the generator 320 as a pump power (*1), to the first preamplifier 340 as a pump power (*2) and to the second preamplifier 370 as a pump power (*3).

The LD power distributor includes a first (Electronically Controlled Variable Optical Attenuator) EVOA 391 to stabilize the laser power supplied to the oscillator 35 and a second EVOA 392 to stabilize the laser power supplied to the generator 320. In this fiber laser module 93, by providing the preamplifiers 340 and 370 for each amplifier 330 and 360 for the source light 95 and 96, and the LD poser distributer 390 distributes the leaser power from the common laser diode LD0 395 to each preamplifier 340 and 370 in addition to the oscillator 35 and the generator 320. This configuration allows, not only reducing the LD quantity, but also the laser diode (common LD) 395 that can be running at its operational level, which may be 90% to 100% of the LD's designed output power level.

The whole fiber laser module 93 comprises of 4 subassemblies (stages): oscillator stage (OSC) 35, 1 fÊm generation stage (generator) 320, 1032 nm CPA stage 350, and 1560 nm CPA stage 360. The description of each stage will be given in the following subsections.

The fiber laser module 93 includes a FL module that functions as a pump LD and power distribution 390. There are three LDs 395-397 used and the maximum output power at 980 nm they can provide are 600 mW, 850 mW, and 850 mW from LD0 395, LD1 396, and LD2 397, respectively. LD0 395 provides the pump power for the oscillator 35, amplifier for 1 fÊm generation 320, and the preamplification stages 340 and 370 before the CPA stages 350 and 380. First, the output (laser power) from LD0 395 is directly spliced to a 20/80 coupler (FL14). The 20% arm is then spliced to EVOA1 391, which can be controlled electronically. A software loop can work with this component to precisely control the output power from the oscillator 35. The 80% arm from FL14 is then split into a 50/50 ratio with a coupler (FL15). One arm from FL15 goes to EVOA2 392, which is used to control the amplifier output power for the stable 1 fÊm generation in the generator 320. The other 50% arm from FL15 is then split into 50/50 again, each arm is then spliced to the preamplifier pump input in the CPA stages 330 and 360.

The fiber laser OSC 35 is built with an Er-doped active fiber, providing the output wavelengths in the C-band range (1530 nm to 1565 nm), and the laser diode, LD0 395 in the distributor 390, working at 976 nm. The fiber used in this oscillator 35 includes the PM-SMF with anomalous and normal dispersion at C-band wavelengths. This is to manage the cavity dispersion for minimizing the unwanted nonlinear effect inside the cavity. The fiber length is precisely tailored to match the repetition rate in the output specification, which is 12 MHz. The laser output 35a is mode-locked with a SAM, giving a FWHM spectral bandwidth of 6 to 8 nm and an average power of 1 to 1.5 mW, depending on the property of SAM and the Er-fiber. 10% of the output 35a is split by a fiber coupler and sent to PD0 for the oscillator power monitoring. This OSC power monitor provides a feedback to the electronic board controlling the applied voltage to EVOA1 391 for a constant output power control of the OSC 35. The remaining 90% will be split in 50/50 and sent to the 1 fÊm generation stage 320 and the 1560 nm CPA stage (the second amplifier) 360, respectively.

The function of the stage 320 is to generate 1 fÊm wavelength narrowband first source laser light 33 from the 1560 nm base laser 35a as the first laser source. The purpose is to obtain the exactly the same repetition rate for both 1 fÊm arm and 1.5 fÊm arm. In this stage 360, the power amplification is done with an EDFA (Er02) built within this stage 360 and the average output power from the amplifier is ~18 mW. 1% of the power is coupled out and sent to PD1 right at the output of the amplifier for power monitoring. The signal from PD1 becomes the feedback to the board controlling EVOA2 392 so the output power from this EDFA can remain constant. The EDFA output pulse will be compressed directly by a piece of fiber providing negative dispersion. At the splice spot to the HNLF 325, the FWHM pulse duration is compressed down to ~60 fs, corresponding to a peak power of ~25 KW. An optical pulse with this peak power sent into a short piece of HNLF makes the wavelength extend from 1560 nm and eventually covers a range from 1 fÊm to 1.7 fÊm. This is the so-called SC generation process. That is, with this peak power, the pulse propagates in the HNLF 325 with strong nonlinear effects and the spectrum can be broadened from 1560 nm to both short and long wavelengths, eventually forming a supercontinuum spectrum spanning from 1 μm to 1.7-1.8 μm. This 1 fÊm part is our target which will be harvested for the next stage of amplification 330.

The 1032 nm CPA stage 330 includes the preamplification, pulse stretch and the final amplification processes. The 50% pump split branch not connected to any EVOA in the distributor 390 is split to 50/50 again here by another fiber coupler (FL16). One arm goes to the preamplifier 340 in this 1032 nm CPA stage 330, and the other goes to the preamplifier 370 of 1560 nm CPA stage 360, which will be introduced later. The generated 1 fÊm will be sent into the port #1 of a 1 fÊm CIR 333. From the port #1 to the port #2 of this CIR 333, only the 1 fÊm part will be selected from the SC spectrum due to the component property. At the port #2, an Yb-fiber (Yb01), a CFBG 335, and a 1030/980 WDM/Tap hybrid component 336 are spliced in sequence. The selected 1 fÊm seed meets the Yb-fiber first and gets amplified. Then the CFBG 335 reflects ~40% power within a wavelength range from 1018 nm to 1053 nm. Wavelengths outside of this range will directly transmit the CFBG 335 and come out from the WDM 336. The output of WDM 336 is used as the monitor of spectrum (to tap2) and power (to PD2) after this preamplifier 340. The reflected part will pass through the Yb-fiber (Yb01) again and have the second amplification before going back into the port #2. The pre-amplified 1 fÊm pulse going into the port #2 comes out from the port #3 of the CIR 333. At this point, the 1 fÊm pulse has been stretched and ready to be amplified in the final amplifier 350.

LD1 396 is an individual laser diode providing the pump power up to 850 mW for 1032 nm final amplifier 350. First the seed from the CIR port #3 will spliced with an isolator/WDM hybrid component 337. This component protects the previous stages from the damages due to the reflected light and the residual pump. An Yb-fiber (Yb02) and a WDM 338 are then spliced in sequence to complete the construction of the 1032 nm CPA stage 330. The final output (first light source) 95 provides optical pulses at 12 MHz with a FWHM pulse duration of ~66 ps. The spectral FWHM bandwidth is ~14 nm and the average output power directly from the FC/APC connector connected to a collimator should be in a range from 450 mW to 520 mW. A 1% Tap is coupled to PD3 and tap3 for the power and spectrum monitoring, respectively. PD3 also provides the feedback to form a control loop for the constant output from the 1032 nm CPA stage 330.

The 1560 nm CPA stage 360 also includes the preamplification, pulse stretch and the final amplification processes. The concept is identical to the 1032 nm CPA stage 330 but only a slightly difference in the components due to the operation in different wavelength region. The pump source of the preamplifier 370 is the other half of the split pump from the distributor 390. The seed of 1560 nm beam (second source pulses) 34 is the other half of the split from the 80% of the OSC output 35*a*. The same idea of the 1032 nm CPA stage 330 is applied for the 1560 nm CPA stage 360, but the 1560 nm CPA stage 360 uses 1560 nm CIR 361 port #1 to bring the seed to the preamplification and the pulse stretching processes by using CFBG 363 and WDM 364 components working at 1560 nm. LD2 397 is another individual laser diode providing the pump power up to 850 mW for 1560 nm final amplifier 380. From the port #3 of CIR 361, the pre-amplified seed is sent to the Er-fiber (Er04) and a Tap/Isolator/WDM hybrid component 365 to complete the 1560 nm CPA stage 360.

The final output provides optical pulses at 12 MHz as the 1560 nm output 96. The FWHM pulse duration is ~35 ps and the FWHM spectral bandwidth is ~7 nm. The average output power is in a range of 130 mW to 180 mW. A 1% Tap is coupled to PD4 and tap4 for the power and spectrum monitoring, respectively. PD4 also provides the feedback to form a control loop for the constant output from the 1560 nm CPA stage 360.

Figure 4:
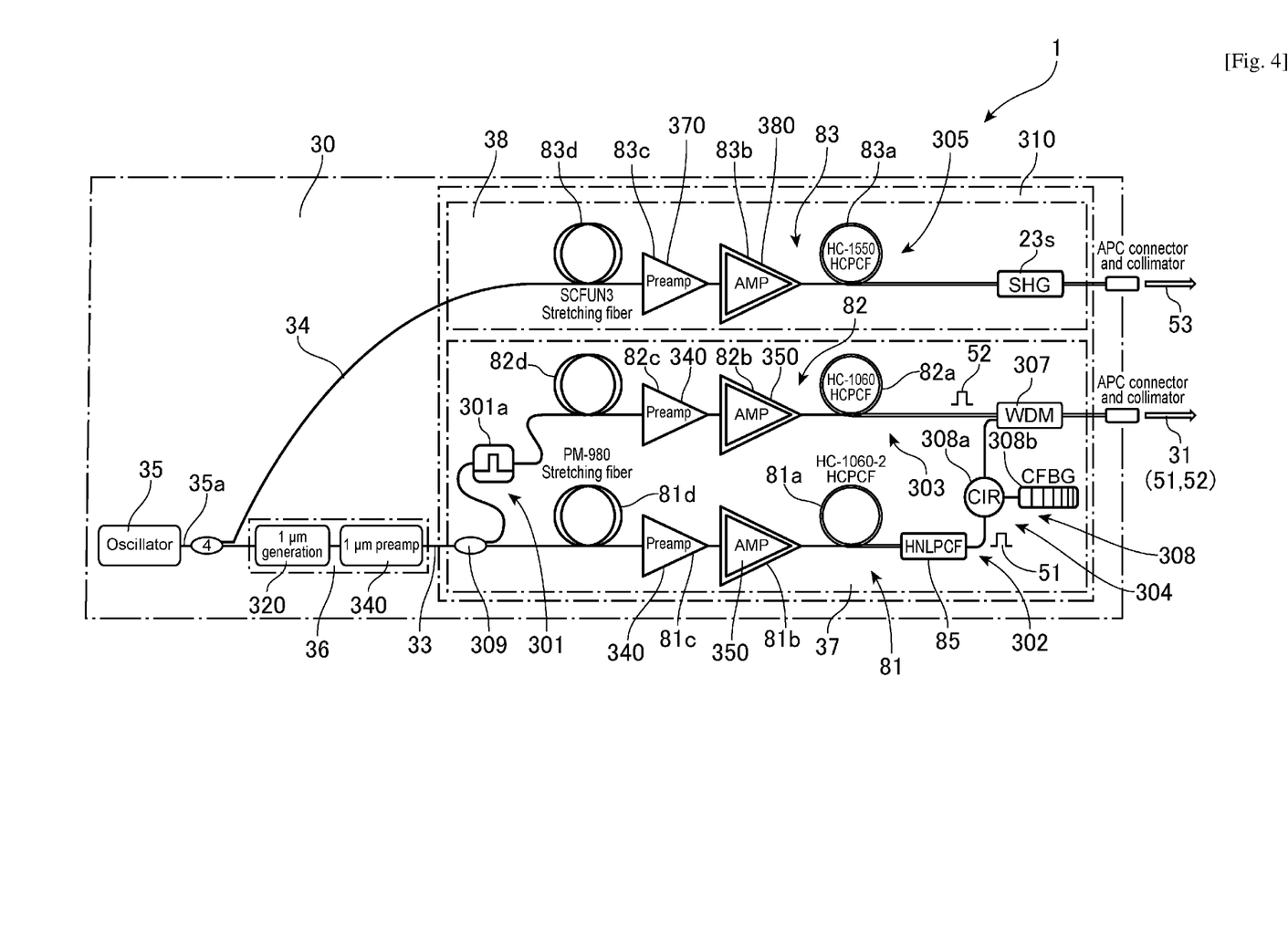
FIG. 4 depicts a block diagram of an embodiment of a laser module of this invention.

FIG. 4 depicts one of the embodiments of the laser module 30 of this invention. This laser module 30 is a full fiber laser module and includes the oscillator 35 for supplying the base laser 35*a* with mode-locked to be split to the first source laser light 33 and the second source laser light 34, the 1 fÊm laser generation stage (first laser source) 36 for generating the narrowband first source laser light 33 from the base laser 35*a*, and a plurality of routes (optical fiber routes, optical fiber sections) 310. The plurality of routes 310 includes: (i) a first route 301 for splitting the first source light pulses 33 for generating broadband first light pulses (Stokes light pulses) 51 and narrowband second light pulses (pump light pulses) 52; (ii) a second route 302 for amplifying and broadening a range of wavelengths with a first train 81 that includes a first amplifier 81*b*, a first hollow-core photonic crystal fiber (HCPCF) 81*a*, and highly non-liner photonic crystal fiber (HNLPCF) 85 spliced directly (without free space) to supply the broadband first light pulses (the Stokes light pulses) 51; (iii) a third route 303 for amplifying with a second train 82 that includes a second amplifier 82*b* and a second HCPCF 82*a* spliced directly (without free space) to supply the narrowband second light pulses (the pump light pulses) 52: (iv) a fourth route 304 for multiplexing the Stokes light pulses 51 and the pump light pulses 52 and outputting the Stokes light pulses 51 and the pump light pulses 52 overlapping in time as an irradiation beam 31 to irradiate the target 5; and (v) a fifth route 305 for generating a narrowband third light pulses (the probe light pulses) 53 with a third train 83 that includes a third amplifier 83*b*, a third HCPCF 83*a* and a SHG 23*s* spliced directly (without free space) to supply the probe light pulses 53. The first route 301, the second route 302, the third route 303 and the fourth route 304 configure the Stokes-pump pulse generation stage 37 for generating the Stokes light pulses 51 and the pump light pulses 52 from the first source laser light 33. The fifth route 305 configures the probe pulse generation stage 38 for generating the probe light pulses 53 from the second source laser light 34.

The oscillator 35 may have the same or common configurations with those described with reference to FIG. 3. The 1 fÊm laser generation stage 36 may include the generator 320, or the generator 320 and the 1 fÊm laser preamplifier 340 described above. The first route 301 may include a 50/50 coupler 309 for separating the first source laser light 33 to the second route 302 and the third route 303 and a narrow band filter 301a for conditioning the input for the narrowband pump light pulses 52. The range of wavelengths the first source laser light 33 is centered at 1030 nm.

The first train (first arm, first line, first series of optical fibers) 81 in the second route 302 may include a stretching fiber 81d, a preamplifier 81c, the amplifier 81b, the HCPCF 81a and the HNLPCF 85 connected without free space. The preamplifier 81c and the amplifier 81b may respectively have the same or common configurations with the preamplifier 340 and the amplifier 350 described above. For the stretching, instead of the stretching fiber 82d, the configurations using the CFBG described in the 1032 nm CPA stage 330 can be applied.

The HCPCF 81a replaces the free-space compressor applied in the optical module 90 described above and delivers the compressed high peak power pulses at the end of the HCPCF 81a. The HCPCF 81a can be directly spliced to the HNLPCF 85 to use it as the supercontinuum PCF (SCPCF) for generating the broadband Stokes light pulses 51. The documents suggest that the HCPCF 81a can be used as an outstanding fiber beam delivery or extremely efficient nonlinear compressor (For example, Martin Maurel, Matthieu Chafer, Benoit Debord, Foued Amrani, Benoit Beaudou, et al. Scalable hollow fiber pulse compressor for NIR and UV lasers. SPIE Photonic West 219 February 2019, San Francisco, United States. Paper 10899. hal-02329692).

By using the first train 81 which includes the first amplifier 81b, the first HCPCF 81a, and the HNLPCF 85 directly spliced, the all-fiber Stokes generation from the first source laser light 33 having the range of wavelengths centered at 1030 nm can be provided and, before the final collimating, alignment-free Stokes light pulses 51 can be supplied. In the second route 302, by splicing (connecting) directly (without free space) two different types of photonic crystal fibers (PCFs), i.e., HCPCF 81a and HNLPCF 85 with the amplifier 81b, the compression function provided by the HCPCF 81a and the supercontinuum (SC) generation function provided by the HNLPCF 85 can be integrated into a single series of fibers (the first train) 81 with the amplifier 81b. Hence, the system 1 and the optical module 10, which include the laser module 30, can be made compact by omitting one or more free-space grating compressors and other free-space optical elements.

In addition, by using the all-fiber (full-fiber) Stokes generation system (the second route) 302, the loss in the free-space propagation can be reduced, so the power level of the Stokes light pulses 51 can be easily increased or the energy consumption in the laser module 30 can be reduced. For using the HCPCF 81a as the compressor, it is expected that HCPCF 81a of 5 to 12 m in length, and even more suitably 7 to 9 m, will be required for the broadband Stokes light pulse generation.

The second train (second arm, second line, second series of optical fibers) 82 in the third route 303 may include a stretching fiber 82d, a preamplifier 82c, the amplifier 82b and the HCPCF 82a connected without free space. The preamplifier 82c and the amplifier 82b may respectively have the same or common configurations with the preamplifier 340 and the amplifier 350 described above. For the stretching, instead of the stretching fiber 82d, the configurations using the CFBG described in the 1032 nm CPA stage 330 can be applied.

By using the second train 82 which includes the second amplifier 82b and the second HCPCF 82a directly spliced, the all-fiber pump generation from the first source laser light 33 having the range of wavelengths centered at 1030 nm can be provided and, before the final collimating, alignment-free pump light pulses 52 can be supplied. In the third route 303, by splicing (connecting) HCPCF 82a directly (without free space) with the amplifier 82b, the integrated single series of fibers (the second train) 82 is provided. Hence, the system 1 and the optical module 10, which include the laser module 30, can be made compact by omitting one or more free-space grating compressors and other free-space optical elements.

In addition, by using the all-fiber (full-fiber) pump generation system (the third route) 303, the loss in the free-space propagation can be reduced, so the power level of the pump light pulses 52 can be easily increased or the energy consumption in the laser module 30 can be reduced. For using the HCPCF 82a as the compressor, it is expected that HCPCF 82a of 10 to 20 m in length, and even more suitably 12 to 15 m, will be required for the narrowband pump light pulse generation.

The fourth route 304 may include a chirp rate conditioner 308 for varying at least one of a chirp rate of the Stokes light pulses (first light pulses) 51 supplied by the first route 302 and a chirp rate of the pump light pulses (second light pulses) 52 supplied by the third route 303 to make them substantially equal. This fourth route 304 includes the chirp rate conditioner 308 for controlling the chirp rate of the Stokes light pulses 51. The chirp rate conditioner 308 may include a CIR 308a and a CFBG 308b connected to the CIR 308a. The output from the second route 302 is injected into the CFBG 308a via the CIR 308a, and the light reflected from the CFBG 308a is injected into the CIR 308a, and then the compensated Stokes light pulses 51 are outputted from the CIR 308a to overlap with the pump pulses 52 by the WDM 307. The chirp rates (CRs) of the Stokes light pulses 51 and the pump light pulses 52 should be the same as for spectral focusing technique. In this system 1, using the fourth route 304 integrated with the second route 302 and the third route 303, the Stokes light pulses 51 and the pump light pulses 52 can be emitted as the combined irradiation beam 31 without using free space optical elements for combining the Stokes light pulses 51 and the pump light pulses 52. Hence, more compact system 1 can be provided and the loss of power due to the free-space propagation can be reduced.

The third train (third arm, third line, third series of optical fibers) 82 in the fifth route 305 may include a stretching fiber 83d, a preamplifier 83c, the amplifier 83b, the HCPCF 83a and the SHG 23s connected without free space. The preamplifier 83c and the amplifier 83b may respectively have the same or common configurations with the preamplifier 370 and the amplifier 380 of the 1560 nm CPA stage 360 described above. For the stretching, instead of the stretching fiber 83d, the configurations using the CFBG described in the 1560 nm CPA stage 360 may be applied.

By using the second train 83 which includes the second amplifier 83b, the second HCPCF 83a and the SHG 23s directly spliced, the all-fiber probe generation from the second source laser light 34 having the range of wavelengths centered at 1560 nm can be provided and, before the final collimating, alignment-free probe light pulses 52 with the third range R3 of wavelengths that is different from and shorter than the second range R2 of wavelengths. Hence, the system 1 and the optical module 10, which include the laser module 30, can be made compact by omitting one or more free-space grating compressors and other free-space optical elements for generating the probe light pulses 53 with 780 nm from the base light pulses with 1560 nm. In addition, the loss in the free-space propagation can be reduced. For using the HCPCF 83a as the compressor, it is expected that HCPCF 82a of 5 to 12 m in length, and even more suitably 7 to 9 m, will be required. The SHG 23s may include the PPLN as described above.

In this system 1, the laser module 30 emits the combined beam 31 that includes the Stokes light pulses 51 with the R1 wavelength range and compressed and the pump light pulses 52 with the R2 wavelength range and compressed, and the probe light pulses 53 with the R3 wavelength range and compressed. Therefore, the optical module 10 that includes the laser module 30 should have only the optical path 23 for controlling the delay and modulation of the probe pulses 53 and the optical path for combining the beam 31 and the probe pulses 53 to irradiate the target 5 via the lens or lens system 45 by using the free space optical elements 29. Thus, the space for arranging the free space optical elements 29 on the optical plate 20 can be minimized and the loss in the free-space propagation can be reduced. It makes possible to provide the compact system 1 for generating and detecting the CARS signals 55. In addition, by minimizing the space and the number of elements to be mounted on the free space (free air), it becomes possible to provide a highly reliable system 1 by suppressing the effects of vibration, temperature, and other environmental changes. If the delay module 23a and the modulation module 23d are not required, the laser module 30 that supplies a laser beam which includes (overlaps) not only the Stokes light pulses 51 and the pump light pulses 52, but the probe 53 as well, may be provided including a route that is similar to the fourth route 304, and the system 1 without any free space optical element may be provided.

Figure 5:
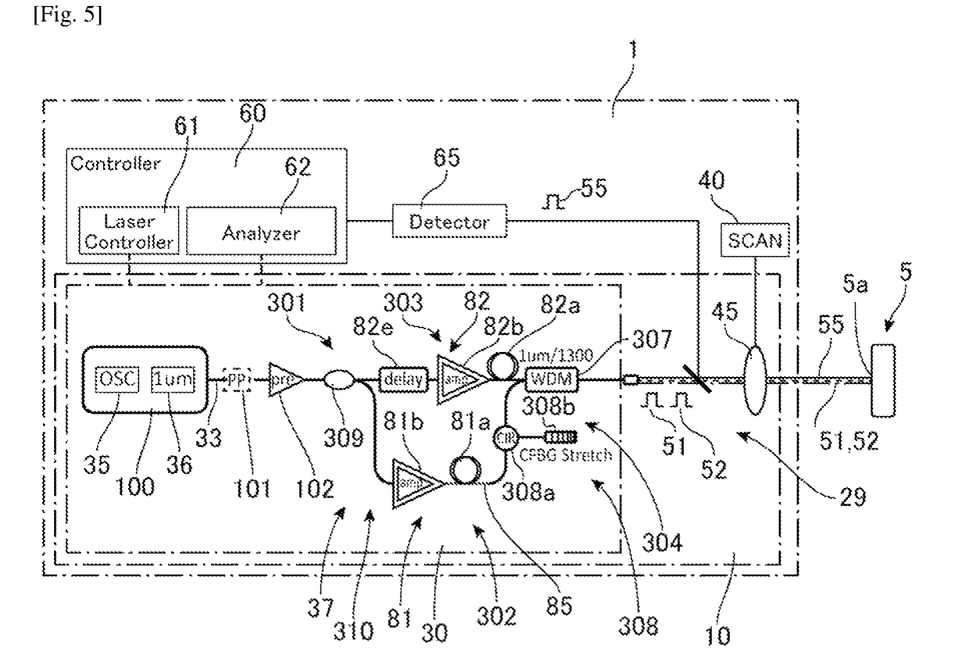
FIG. 5 depicts an embodiment of a different system of this invention.
Figure 6:
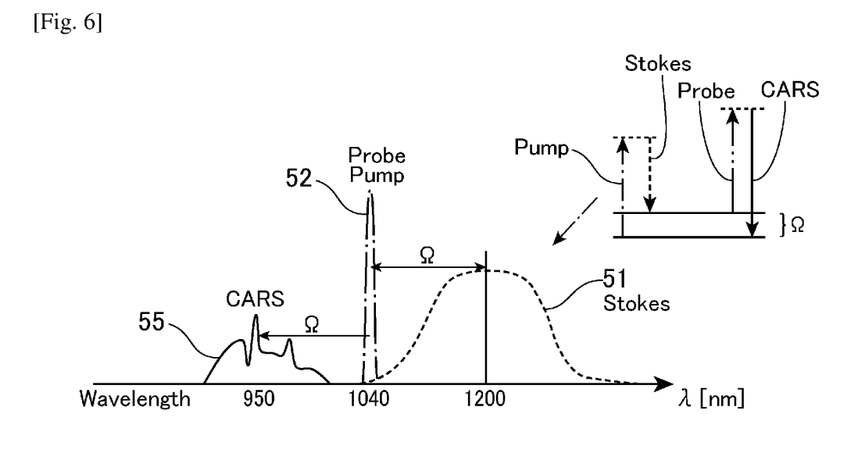
FIG. 6 depicts a wavelength plan of the above system.

FIG. 5 illustrates another embodiment of the system 1. This system 1 is based on two-beam CARS scheme that includes the Stokes light pulses 51 and the pump light pulses 52, and the pump light pulses 52 function as the probe light pulses as well. FIG. 6 shows an example of the wavelength plan of two-beam CARS. The Stokes light pulses 51 has the first range R1 of wavelengths 1085-1230 nm (400 $cm^{-1}$~1500 $cm^{-1}$), the pump light pulses 52 have the second range R2 of wavelengths 1040 nm that is shorter than the first range R1. The CARS signal 55 with the wavelength range of approx. 900-1000 nm is generated. In this system 1, the optical module 10 which includes the laser module 30, should have only the light path for separating the CARS signal 55 from the returned beam through the lens 45 by using the free space optical elements 29. If the system 1 is for detecting forward CARS signals instead of the system for detecting the epi (backward) CARS signals, the system may be configured without any free space optical element.

The laser module 30 of this system 1 is a laser module with the all-fiber solution (laser beam supplying unit with all-fiber solution, full fiber laser module) and includes: a laser source 100 configured to generate the narrowband source laser light 33; and a plurality of routes 310 configured by optical fibers without using free space. The laser module 30 including the plurality of routes 310 may be configured by a photonic integrated circuit without using free space. The plurality route 310 may include: (i) a first route 301 for splitting the source laser light 33 for generating a broadband first laser light (Stokes light) 51 and a narrowband second laser light (pump light) 52; (ii) a second route 302 for broadening a range of wavelengths and amplifying the broadband first laser light 51; (iii) a third route 303 for amplifying the narrowband second laser light 52; and (iv) a fourth route 304 for multiplexing (overlapping) the broadband first laser light 51 and the narrowband second laser light 52 and outputting the broadband first laser light 51 and the narrowband second laser light 52 at least partially overlapping in time (temporally (and spatially in the route)) as an irradiation beam to irradiate a target 5. The second route 302 may include the first train 81 explained above and the third route 303 may include the second train 82 explained above. The third route 303 may include a delay stage (delay line) 82e for compensating the time taken for passing the PCF 85 in the second route 302 and scanning the pump light pulses 52 over the Stokes light pulses 51. The delay stage 82e can be provided, for example, with a certain length of optical fiber.

The laser source 100 may include the oscillator 35 and the 1 fÊm leaser generation stage 36. Between the first route 301 and the laser source 100, a pulse picker (PP) 101 and a preamplifier 102 may be provided. PP 101 can be provided at one of the positions of before and after the preamplifier 102. The PP 101 may be provided to reduce the average power.

As explained above, the present invention generally relates to a system 1 for a spectroscopy or a microscopy using laser lights (laser beams) pulses generated by the laser module 30. In the above, the laser module 30 is described as a full-fiber module, but it can also be realized using a photonic integrated circuit without free space for connecting the elements.

We are initially focused on just direct fiber-based SC generation without going to free space compressors and focusing back into the PCF. This operation currently is about 60% on the Optics plate using many free space optical elements, such as mirrors, prisms, filters, and others. Such configuration is very complexity and costly. In this system 1, the full fiber type or the photonic integrated circuit type laser module 30 is provided and can solve the problems.

The laser module 30 described above as one of embodiments of this invention is a laser beam supplier for emitting the irradiation beam for generating CARS signal 55 on the target 5. The system 1 of this invention may further comprise the detector 65 configured to detect a signal beam generated by the target as a result of irradiation of the target with the irradiation beam. The signal beam 55 may include a result of nonlinear optical process (resonant component), generated by the laser pulses 51 and 52 (and 53). One of the nonlinear optical processes is the CARS process described above. The system 1 may be applicable for the other nonlinear optical processes such as: second harmonic generation (SHG): sum frequency generation (SFG): difference frequency generation (DM); third harmonic generation (THG); third-order sum frequency generation (TSFG); coherent anti-Stokes Raman scattering (CARS); stimulated Raman scattering (SRS) (stimulated Raman gain (SRG), stimulated Raman loss (SRL)); optical Kerr effect (OKE); Raman induced Kerr effect (RIKE); stimulated Rayleigh scattering: stimulated Brillouin scattering (SBS); stimulated Kerr scattering: stimulated Rayleigh-Bragg scattering: stimulated Mie scattering: self phase modulation (SPM); cross phase modulation (XPM): two-photon absorption; and two-photon excitation fluorescence (TPEF).

Figure 7:
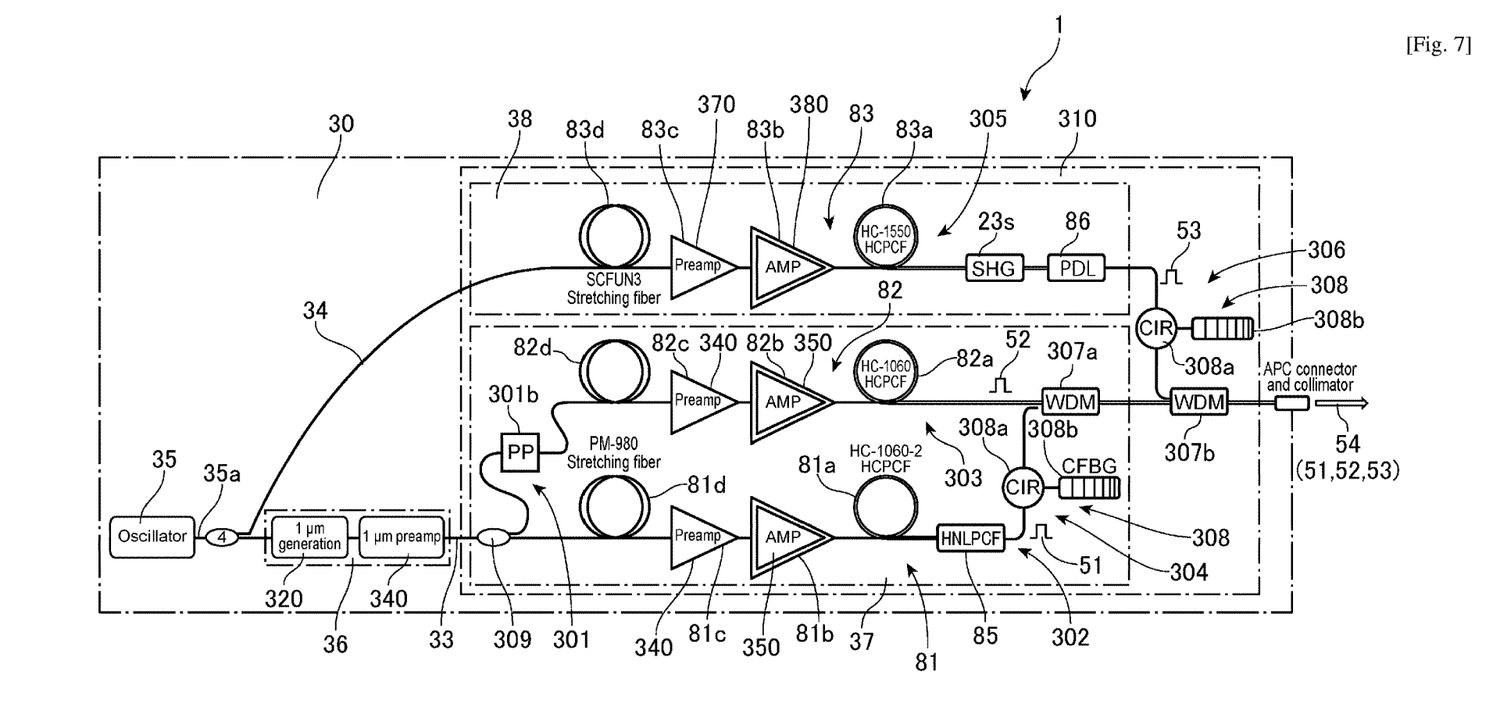
FIG. 7 depicts a block diagram of an embodiment of a different laser module of this invention.

FIG. 7 illustrates another embodiment of the system 1 with another type of laser module 30. The plurality of routes 310 of this laser module 30 includes, in addition to the first route 301, the second route 302, the third route 303, the fourth route 304 and the fifth route 305 described above, a sixth route 306 for multiplexing the Stokes light pulses (broadband first light pulses) 51, the pump light pulses (narrowband second light pulses) 52, and the probe light pulses (narrowband third light pulses) 53 and outputting the Stokes light pulses 51, the pump light pulses 52 and the probe light pulses 53 overlapping with a time delay as an irradiation beam 54 to irradiate a target 5. The third train 83 of the fifth route 305 may further include a programmable delay line (PDL, programmable optical path delay module (POPDM)) 86 to control the delay and the modulation (by using the delay) of the probe light pulses 52 to the Stokes light pulses 51 and the pump light pulses 52. The sixth route 306 may include the chirp rate conditioner 308 which may have the same as or corresponding configuration to the chirp rate conditioner 308 of the fourth route 304, for controlling the chirp rate of the probe light pulses 53. In this laser module 30, the Stokes light pulses 51 and the pump light pulses 52 are multiplexed or combined by the first WDM 307a in the fourth route 304, and the probe light pulses 53 with the time delay are multiplexed or combined with the Stokes light pulses 51 and the pump light pulses 52 by the second WDM 307b in the sixth route 306 then supplied as the irradiation beam 54. Therefore, in the system 1 with this laser module 30, in effect, the space for arranging the free space optical elements 29 including the optical path 23 for controlling the delay and modulation of the probe pulses 53 is no longer needed and the free space optical elements to be placed there are no longer needed. Thus, it becomes possible to provide a highly reliable compact system 1 by suppressing the effects of vibration, temperature, and other environmental variations.

The PDL 86 that can control the optical path delay precisely in a short time (at once, without substantial delay) may include an on-chip type multi-channel selector to select a suitable path for the desired delay among the multiple paths with the multiple delays due to the lengths, structures and/or mediums (optical materials) to increase and decrease the delays step-by-step via a program or commands electrically or photo-electrically. The PDL 86 may include an optical device (optoelectronic devices) or fibers that can change the optical path delay using integrated heaters or pressure (applied force). The laser module 30 may include a pulse picker (PP) 301b for controlling the pulse width of the pump light pulses 52 generated by the third route 303. By relatively broadening the pulse width of the pump light pulse 52 within the range act as the pump light, the input energy for generating the base CARS signal to be probed by the probe light pulses 53 may be increased and the level of the CARS signal (TD-CARS) 55 generated by the probe light pulses 53 may be increased.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A system comprising a laser module that includes:
    a first laser source configured to generate a narrowband first source laser light; and
    a plurality of routes configured by optical fibers and/or a photonic integrated circuit without using a free space, wherein the plurality of routes includes:
    a first route for splitting the first source light pulses for generating broadband first light pulses and narrowband second light pulses;
    a second route for amplifying and broadening a range of wavelengths with a first train including a first amplifier, a first hollow-core photonic crystal fiber (HCPCF), and highly non-liner photonic crystal fiber (HNLPCF) spliced to supply the broadband first light pulses; and
    a third route for amplifying with a second train including a second amplifier and a second HCPCF spliced to supply the narrowband second light pulses.

2. The system according to claim 1, wherein the plurality of routes further includes a fourth route for multiplexing the broadband first light pulses and the narrowband second light pulses and outputting the first light pulses and the second light pulses overlapping in time as an irradiation beam to irradiate a target.

3. The system according to claim 2, wherein the fourth route includes a chirp rate conditioner for varying at least one of a chirp rate of the first light pulses supplied by the second route and a chirp rate of the second light pulses supplied by the third route to make them substantially equal.

4. The system according to claim 1, wherein the first light pulses include a first range of wavelengths and the second light pulses include a second range of wavelengths shorter than the first range of wavelengths.

5. The system according to claim 4, wherein the plurality of routes further includes a fifth route for generating a narrowband third light pulses with a third range of wavelengths shorter than the second range of wavelengths from a second source laser light, and with a third train including a third amplifier, a third HCPCF and a Second Harmonic Generation (SHG) spliced to supply the third light pulses.

6. The system according to claim 5, wherein the plurality of routes further includes a sixth route for multiplexing the broadband first light pulses, the narrowband second light pulses, and the narrowband third light pulses and outputting the first light pulses, the second light pulses and the third light pulses overlapping with a time delay as an irradiation beam to irradiate a target.

7. The system according to claim 5, further comprising an optical module for supplying the first light pulses, the second light pulses and the third light pulses to the target as the irradiation beam.

8. The system according to claim 5, wherein the laser module further includes an oscillator that is configured to output a base laser with mode-locked to be split for generation of the first source laser light and the second source laser light.

9. The system according to claim 1, wherein a range of wavelengths of the first source laser light is centered at 1030 nm.

10. The system according to claim 5, wherein a range of wavelengths the first source laser light is centered at 1030 nm and a range of wavelengths the second source laser light is centered at 1560 nm.

11. The system according to claim 1, further comprising a detector configured to detect a signal beam generated by the target as a result of irradiation of the target with the irradiation beam.

12. The system according to claim 11, further comprising a scanner that is configured to scan the target with the irradiation beam to acquire the signal at each pixel.

13. The system according to claim 11, further comprising a scanner that is configured to scan the target with the irradiation beam to acquire the signal at each voxel.

14. The system according to claim 1, further comprising an optical module for supplying the first light pulses as Stokes light pulses and the second light pulse as pump light pulses for generating CARS signals.

15. The system according to claim 6, wherein the optical module further includes a light path for supplying the first light pulses as Stokes light pulses, the second light pulse as pump light pulses and the third light pulses as probe light pulses for generating CARS signals.

16. The system according to claim 7, wherein the optical module further includes a light path for supplying the first light pulses as Stokes light pulses, the second light pulse as pump light pulses and the third light pulses as probe light pulses for generating CARS signals.

* * * * *